United States Patent
Yamada

(10) Patent No.: US 6,842,801 B2
(45) Date of Patent: Jan. 11, 2005

(54) SYSTEM AND METHOD OF IMPLEMENTING A BUFFER MEMORY AND HARD DISK DRIVE WRITE CONTROLLER

(75) Inventor: Shuji Yamada, Fufisawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 721 days.

(21) Appl. No.: 09/838,994

(22) Filed: Apr. 20, 2001

(65) Prior Publication Data

US 2002/0059476 A1 May 16, 2002

(30) Foreign Application Priority Data

Apr. 21, 2000 (JP) ........................................ 2000-121853

(51) Int. Cl.⁷ .......................... G06F 13/00; G06F 12/00
(52) U.S. Cl. ............................ 710/56; 710/52; 710/55; 710/57; 711/113; 711/118; 711/125
(58) Field of Search .............................. 710/52, 55, 57, 710/56; 711/113, 118, 125

(56) References Cited

U.S. PATENT DOCUMENTS 5,450,546 A * 9/1995 Krakirian ..................... 710/57
5,561,823 A * 10/1996 Anderson ..................... 710/52
6,622,206 B1 * 9/2003 Kanamaru et al. .......... 711/113

FOREIGN PATENT DOCUMENTS

JP          2000019379        1/2000

* cited by examiner

Primary Examiner—Tammara Peyton
(74) Attorney, Agent, or Firm—Abdy Raissinia; Dillon & Yudell LLP

(57) ABSTRACT

A method and system for writing data which includes the steps of: receiving a write command, storing associated data in a buffer memory, determining whether or not enough free space exists in the buffer memory to store a subsequent unit of write data, and sending a "command complete" signal to the external device, if it is determined that there exists enough free space to store a subsequent unit of write data. The disk drive unit includes: a random access recording medium, a command memory, a buffer memory, and a logic circuit for determining whether or not enough free space exists in the buffer memory to store a subsequent unit of write data, with a predetermined reference value representing the amount of free space occupied by a typical unit of write data.

10 Claims, 16 Drawing Sheets

*SKIP LENGTH = 0

*SKIP LENGTH
= (LLBA−LENGTH + 1)−ELBA

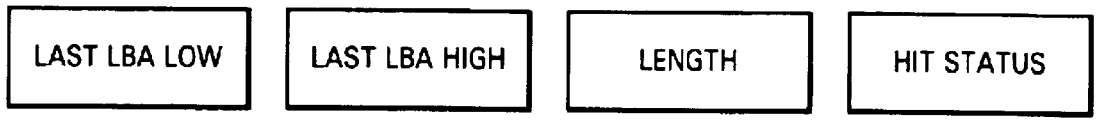
*Fig. 16*
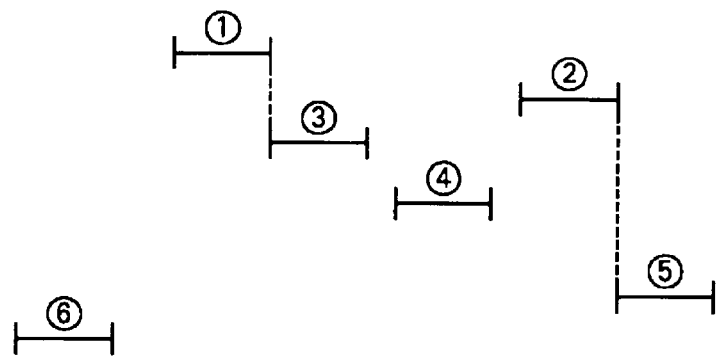
*Fig. 17*
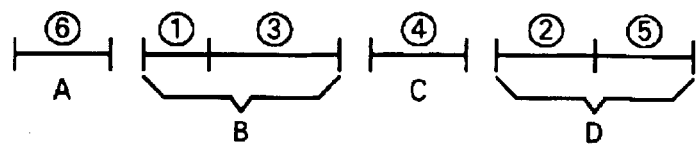
*Fig. 18a*
*Fig. 18b*

SYSTEM AND METHOD OF IMPLEMENTING A BUFFER MEMORY AND HARD DISK DRIVE WRITE CONTROLLER

BACKGROUND OF THE INVENTION

1. Technical Field

The present invention relates in general to the field of data processing systems, and more particularly, the field of data processing systems utilizing a non-volatile memory. Still more particularly, the present invention relates to a system and method of reducing latency in data processing systems utilizing a non-volatile memory.

2. Description of the Related Art

In recent years, processing speeds in computer systems have increased exponentially. Processors with core frequencies of over one gigahertz have become common. However, to take full advantage of modem day processors, all aspects and components of a computer system must be improved. Most modem computer systems utilize hard disk drive technology, as well as random access memory (RAM) and read-only memory (ROM).

Frequently, in today's computer systems, a hard disk drive is utilized as a low-cost, high-capacity data storage device. Unfortunately, hard disk drive units have a slower response time than any other part of a computer system. This is especially the case when multiple write requests are issued in quick succession. When multiple write requests are issued in quick succession, conventional hard disk drive units require considerable latency between an issue of a write request until the write request is actually executed. Most conventional hard disk drive units process the write requests in the order received by implementing a queue of pending write commands while the hard disk drive issues a notification to the host computer that the write data command has been received.

The pending write commands also have associated write data. The write data are stored in a cache memory. It should be readily apparent to ones skilled in the art that there exists at least two methods of writing data stored in the cache memory to a magnetic media of the hard disk drive unit.

In a first method, data are read from the cache memory and written to the magnetic media of the hard disk drive unit in the order the write data are stored in the memory cache. This is similar to a first-in, first-out (FIFO) scheme, where a first command stored in a queue or any type of memory structure well-known in the art is executed first.

In a second method, the pending write commands are executed and the associated data are written to the hard drive unit with reference to a sector information field included in each write command. The sector information included in each write command designates an intended destination for the associated data to be written on the hard disk drive medium.

According to the aforementioned first method well-known in the art, a time delay between write command execution and the writing of the associated data can be large. This time delay is known as seek and rotational latency. A write head included in the disk drive unit spends much time seeking the correct disk sector designated by the sector information included in each write command because the disk drive unit writes the associated data in the order the corresponding write command was received. This first method does not consider the distance between the specified disk sectors between a first write command and a subsequent write command. This limits the execution speed of a data processing system utilizing such a disk drive unit because the speed of write command execution is limited due to the aforementioned latency.

The second method addresses one of the shortcomings of the first method by implementing what should be well-known to those skilled in the art as rotational position optimization (RPO). Also, the second method updates the writing order so as to minimize a seek time of the write head included in the hard disk drive unit. More specifically, when multiple write commands have been stored in a queue, commands are selected sequentially to be executed according to RPO. RPO estimates both a seek time which represents a duration necessary for the write head to find a target track on the recording media plus and a rotational latency of the media, which represents a duration necessary for the write head to access the target sector after successfully reaching the target track. Also, RPO selects a write command in the queue as a next command to be executed by finding a write command with a next lowest estimated seek time and rotational latency.

Since RPO can reduce write command execution time, due to reduced seek time and rotational latency, the performance of the hard disk drive unit and the overall performance of the data processing system utilizing the hard disk drive unit is improved. Despite the improvements presented by RPO, it is still desirable to further reduce the write command execution time.

Another method for reducing write command execution time is a technique disclosed in Japanese Patent Application No. 2000-019379. In this technique of reducing write command execution time, a logical block address of a queued present write command is compared with the logical block address of a next write command to ascertain a positional relationship between the two logical block addresses of the present and the next write commands. A determination is made whether or not the logical block addresses of the present and the next write commands are separated. If the logical block addresses to the present and the next write commands are separated, a determination is made whether or not a separated distance between the logical block addresses of the present and the next write commands is under a predetermined value. If the separated distance is under a predetermined value, write data corresponding to both of the present and the next write commands are written. If it is determined that the logical block addresses of the present and subsequent write commands are separated, a check is made to determine whether or not the separation distance is under a predetermined value. In case the separation distance is determined to be under the predetermined value, write data corresponding to both of the preceding and succeeding write commands are written continuously on the recording medium.

According to the aforementioned data writing method, data are actually written on the recording medium at a minimal distance between the logical block addresses of the present and the subsequent write commands. The write head seek operation is performed at the minimal distance between those logical block addresses, thereby minimizing the latency. Consequently, write operation efficiency, as well as the hard disk drive unit performance are also improved.

SUMMARY OF THE INVENTION

To overcome the foregoing and additional limitations of the prior art, a system and method for writing to a disk drive unit of the present invention is disclosed.

In a method of writing data of the present invention, data are written to a recording medium in response to a write request issued from an external device. First, a write command is received and data associated with the write command is stored in a buffer memory with associated data corresponding to a previously issued write command. Next, a determination of whether or not enough free space exists in the buffer memory to store a subsequent unit of write data is made. A predetermined reference value is utilized to represent an amount of free space occupied by a typical unit of write data. Finally, a "command complete" signal is sent to an external device, if it is determined that there exists enough free space to store a subsequent unit of write data.

The disk drive unit of the present invention includes a random access, disk-like recording medium, a command memory for storing a write command received from an external device until the write command is executed, a buffer memory for storing write data corresponding to the write command temporarily, a writing specification control for specifying which data is written on the recording medium, and a logic circuit for determining whether or not enough free space exists in the buffer memory to store a subsequent unit of write data. If there exists enough free space in the buffer memory to store a subsequent unit of write data, a command complete signal is immediately relayed to the external device, in response to a new write command.

However, if there is not enough free space in the buffer memory to store a subsequent unit of write data, the command complete signal is delayed. The external device cannot send a next write command to the disk drive unit before the external device receives a command complete signal. Therefore, the disk drive unit cannot accept the next write command until enough space has been freed in the buffer memory. Freeing space in the buffer memory is accomplished by writing associated data to buffered write commands to the disk medium.

Preventing further write commands from being sent when the buffer memory is full reduces a latency that results from insufficient free space in the buffer memory. The predetermined reference value is utilized to represent a typical size of a conventional write command that is sufficiently large to take into account multiple commands. This enables the reordering of write commands without introducing unnecessary latencies.

In another preferred embodiment of the present invention, the method of writing data further includes a step of determining whether or not the logical block addresses of the present and subsequent write commands are separated by at least a predetermined distance. If it is determined that (1) there exists enough free space in the buffer memory to store a subsequent unit of write data and (2) the logical block addresses of both the present and subsequent write commands are separated by at least a predetermined minimum distance, a command compete signal is returned to the external device in response to the issued write command.

In the abovementioned configuration, it is possible to determine whether or not a newly received write command is related to a write command stored in the buffer memory by determining whether or not the logical block addresses of both the present and subsequent write command are separated by at least a predetermined minimum distance. If the new write command and the queued write command are separated by at least a predetermined minimum distance, or enough free space exists in the buffer memory, a command complete signal can be immediately sent to the external device, in response to the new write command.

If the new write command and the queued write command are separated by at least a predetermined minimum distance and enough free space does not exist in the buffer memory, the sending of the command complete signal is delayed until enough free space exists in the buffer memory. The external device will then delay the sending of a new write command.

The external device will subsequently delay the issue of a next write command until sufficient free space exists in the buffer memory and the latency resulting from insufficient free space in the buffer memory is reduced, thereby improving the overall performance of a data processing system that utilizes a preferred embodiment of the disk drive unit of the present invention. If it is determined that a new write command and a queued write command are separated by at least a predetermined minimum distance, the new write command is inserted into the queue adjacent to the related queued write command, rearranging the order the queued write commands are written to the disk medium.

If the logical block addresses of the next and a queued write commands are separated by at least a predetermined minimum distance, it is possible to write the data corresponding to both the next and the related queued write commands to adjacent sectors on the disk medium. Consequently, it is also possible to form a write command group consisting of write commands separated by a predetermined minimum distance and optimize the write sequence of the write command group so as to minimize the seek time of the write head and reduce the writing time, thereby improving the writing performance of the disk drive unit.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 16 illustrates a table stored in a RAM 43 in accordance to a preferred embodiment of the present invention;

FIG. 17 depicts a configuration of a write segment table in accordance to a preferred embodiment of the present invention;

FIG. 18 illustrates a chart depicting a method of writing data in accordance to a preferred embodiment of the present invention;

DETAILED DESCRIPTION OF THE PREFERRED EMBODIMENT

Figure 1:
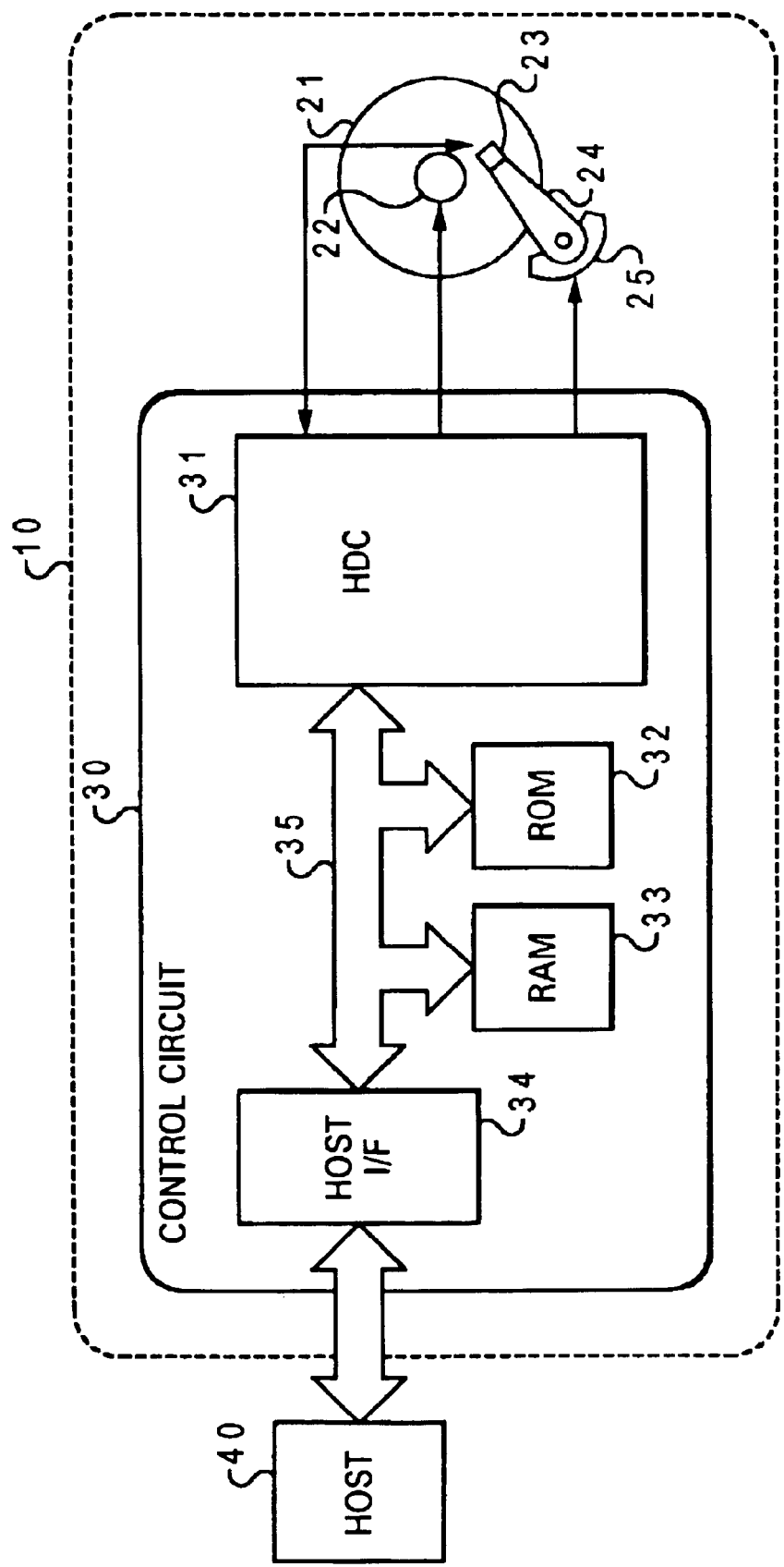
FIG. 1 depicts a schematic block diagram of a hard disk drive (HDD) unit that may be utilized to implement the present invention.

With reference to the figures, and in particular with reference to FIG. 1, there is depicted a schematic block diagram of a hard disk drive (HDD) unit 10 utilized as an external memory unit of a computer in a preferred embodiment of the present invention.

As depicted in FIG. 1, HDD unit 10 includes a magnetic disk 21 utilized as a recording medium for storing data and a spindle motor 22 for rotating magnetic disk 21. A magnetic head 23 writes/reads data to/from magnetic disk 21. Arm 24 has a head 23 at the tip and moves above the recording surface of the magnetic disk 21. An actuator 25 holds arm 24 and drives arm 24 rotationally. Consequently, head 23 is configured to move radially with respect to magnetic disk 21. Head 23 randomly accesses the recording surface of magnetic disk 21.

A driving mechanism configured in magnetic disk 21 includes: a spindle motor 22, head 23, and actuator 25. The driving mechanism is controlled by a control circuit 30. Control circuit 30 includes an hard disk controller (HDC) 31, a ROM 32, a RAM 33, and a host I/F (interface) 34. All components of control circuit 30 are coupled via a bus 35.

HDC 31 controls HDD 10 by utilizing to a control program and data stored in ROM 32. HDC 31 executes arithmetic operations for controlling the servo and controlling writing/reading of data. Consequently, HDC 31 drives spindle motor 22 and actuator 25 so as to write/read data utilizing of both read and write heads of head 23.

RAM 33 functions as a cache memory for temporarily storing data to be written on magnetic disk 21 and data read from magnetic disk 21. The cache memory is implemented as a ring cache memory with a pointer indicating the start address. The cache memory includes pages that correspond to a sector of magnetic disk 21. Data are read from the cache memory and written page-by-page to the corresponding sectors of magnetic disk 21. On the contrary, data read from each sector on magnetic disk 21 is temporarily stored in a predetermined page. Host I/F 34 is an interface circuit used to send/receive data and commands to/from host 40.

Figure 2:
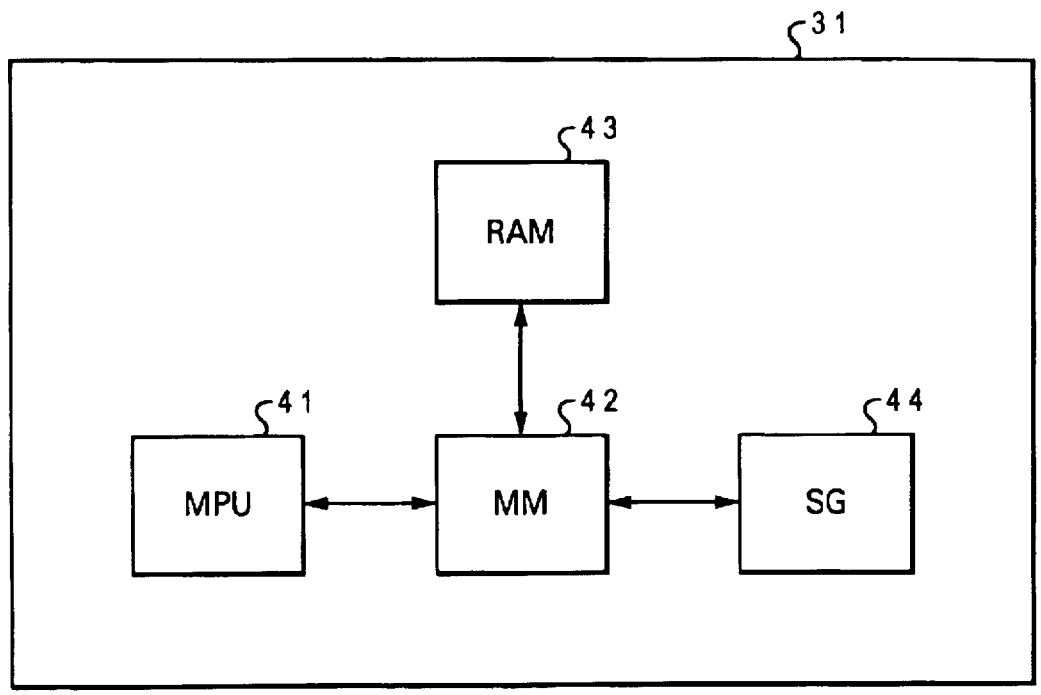
FIG. 2 illustrates a block diagram of a major components of an hard disk controller (HDC) of the HDD in accordance to a preferred embodiment of the present invention.

Referring now to FIG. 2, a functional block diagram depicting the main components of HDC 31 is illustrated. HDC 31 includes: a microprocessing unit (MPU) 41, a memory manager (MM) 42, a RAM 43, and segment handler (SG) 44.

RAM 43 stores a table configured as illustrated in FIG. 16 and a write segment table configured as depicted in FIG. 17. The table as depicted in FIG. 16 includes a NO OF HIT (OVERLAY HIT count) field, a head best skip length (HEAD BEST SKIP LENGTH) field, a head best skip segment ID (HEAD BEST SKIP SEGMENT ID) field, a tail best skip length (TAIL BEST SKIP LENGTH) field, and a tail best skip segment ID (TAIL BEST SKIP SEGMENT ID) field, all of which will be described later in more detail. The write segment table in FIG. 17 is configured by four words. A first and second words are used for LBA and a third word is used for a block length (LENGTH) field, and a fourth word is used for a hit status (HIT STATUS) field. SG 44 accesses RAM 43 via MM 42 to search the table stored in RAM 43. SG 44 also includes a register for the temporary storage of a skip length (SKIP LENGTH) field, as described later in more detail.

According to a preferred embodiment of the present invention, the positional relationship between the logic block addresses (LBA) is checked with respect to an already received queued write command and a subsequent write command newly received from host 40. Then, the available free space in the buffer memory (RAM 33) is checked. A logic circuit, implemented by an MPU 41 included in HDC 31 and the program codes stored in the ROM 32 controls the positional relationship and free space checks. The logic circuit can also be implemented by a hardware circuit configured in SG 44 or RAM 33. The LBA-related information, both head and tail LBAs of the write command, as well as the block length are sent from host 40 with the write command and write data. The write data are stored in RAM 33 and the LBA-related information is stored in a write segment shown in FIG. 17.

In a preferred embodiment of the present invention, a queued write command is referred to as "buffer data" and a subsequent write command is simply referred to as a "write command." The positional relationship between LBAs is referred to simply as a "relationship" or a "positional relationship".

Figure 22:
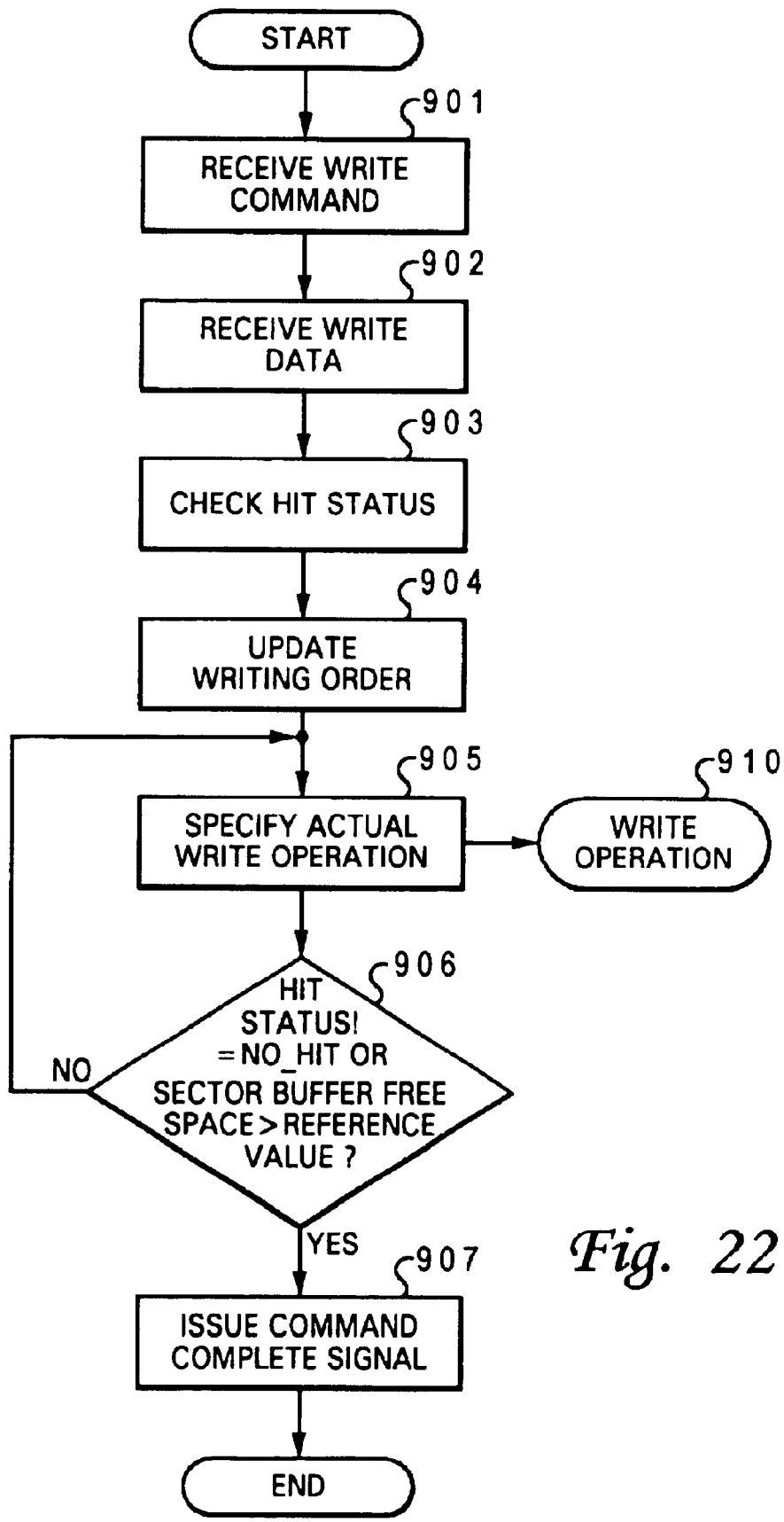
FIG. 22 illustrates a high-level logic flowchart for depicting another method of writing data in accordance to a preferred embodiment of the present invention.

With reference to FIG. 22, there is depicted a high-level logic flowchart for describing a method of data writing in accordance to a preferred embodiment of the present invention. HDC 31 receives a write command sent from external device 40 via the host I/F 34 (step S901). MPU 41 in HDC 31 then decodes the received write command and transfers the information of both LBA and block length to the RAM 43. Next, write command data (step S902) is received. HDC 31 then stores the received data in RAM 33. Described later in more detail is a method of storing data in RAM 33.

Then, the hit status is checked and the execution order of the write commands or the order for writing data on recording medium 21 (step S903 and step S904) is updated. The hit status denotes the relationship between a newly received write command (a write command received in step S901) and a write command already stored in RAM 43 (buffer data). The LBA is utilized to determine which one of the eight categories shown in FIG. 3 represents the relationship between the two write commands in a first stage with respect to the hit status check and the updating of the command execution order.

Figure 3:
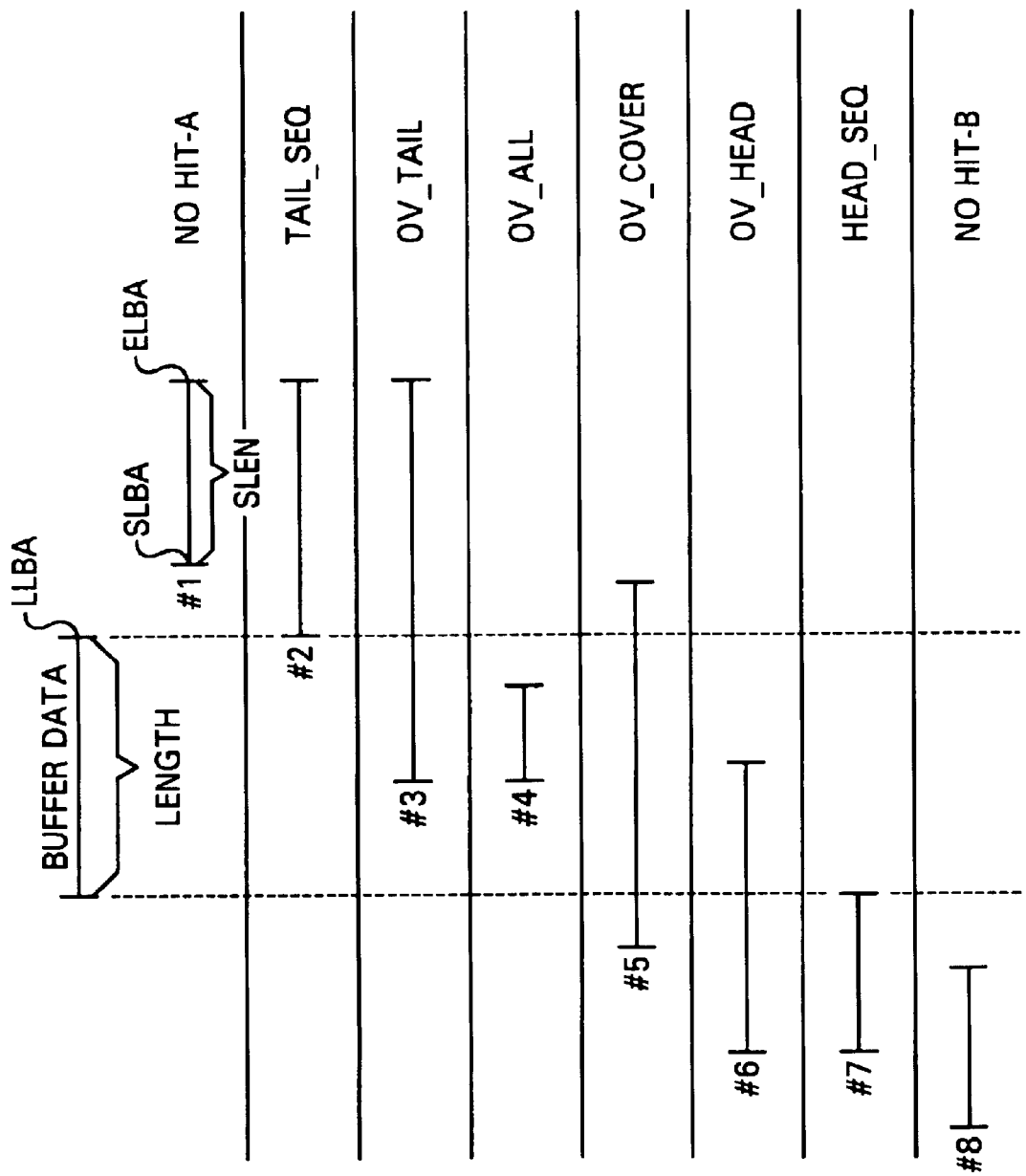
FIG. 3 depicts a relationship between buffer data and a write command in accordance to a preferred embodiment of the present invention.

Referring now to FIG. 3, there is depicted a conceptual chart for denoting the relationship between a queued command stored in RAM 33 and a new write command. The relationship, according to the LBA, is determined to be one of the eight categorized illustrated in FIG. 3. The eight categories are NO HIT-A, TAIL_SEQ, OV_TAIL, OV_ALL, OV_COVER, OV_HEAD, HEAD_SEQ, and NO HIT-B. The determination of the relationship is performed as shown in the high-level logic flowcharts illustrated in FIG. 4 through FIG. 6.

In FIG. 3, the tail LBA of the buffer data writing destination is described as LLBA, as depicted. A buffer data block length is described as LENGTH. In addition, the head LBA of a write command writing destination is described as SLBA and the tail LBA is described as ELBA respectively. And, a write command LBA block length is described as SLEN.

Reference numerals "#1 to #8", as illustrated in FIG. 3, denote write commands. However, reference numerals #1 to #8 are merely utilized to distinguish each write command. Reference numerals #1 to #8 do not indicate the order they are received from host 40.

In a preferred embodiment of the present invention, the positional relationship between write commands with respect to buffer data is classified into 8 types as shown in FIG. 3. The content of each positional relationship is described in detail below.

<NO HIT-A>
When the write command does not overlap the buffer data (case #1), the hit status is determined to be NO HIT-A.
<TAIL_SEQ>
When the write command head overlaps the tail of the buffer data (case #2), the hit status is determined to be TAIL_SEQ.
<OV_TAIL>
When the write command overlaps the tail of the buffer data (case #3), the hit status is determined to be OV_TAIL.
<OV_ALL>
When the buffer data completely overlaps the write command (case #4), the hit status is determined to be OV_ALL.
<OV_COVER>
When the write command completely overlaps the buffer data (case #5), the hit status is determined to be OV_COVER.
<OV_HEAD>
When write command overlaps the head of the buffer data (case #6), the hit status is determined to be OV_HEAD.
<HEAD_SEQ>
When the write command overlaps the head of the buffer data (case #7), the hit status in determined to be HEAD_SEQ.
<NO HIT-B>
When the write command does not overlap the head of the buffer data (case #8), the hit status is determined to be NO HIT-B.

Each of the above determinations is performed by the segment handler (SG) of HDC 31, which compares the LBA information of a write command with the LBA information in the segment table stored in RAM 33. The details of such a determination will now be described with reference to FIG. 4 through FIG. 6.

Figure 4:
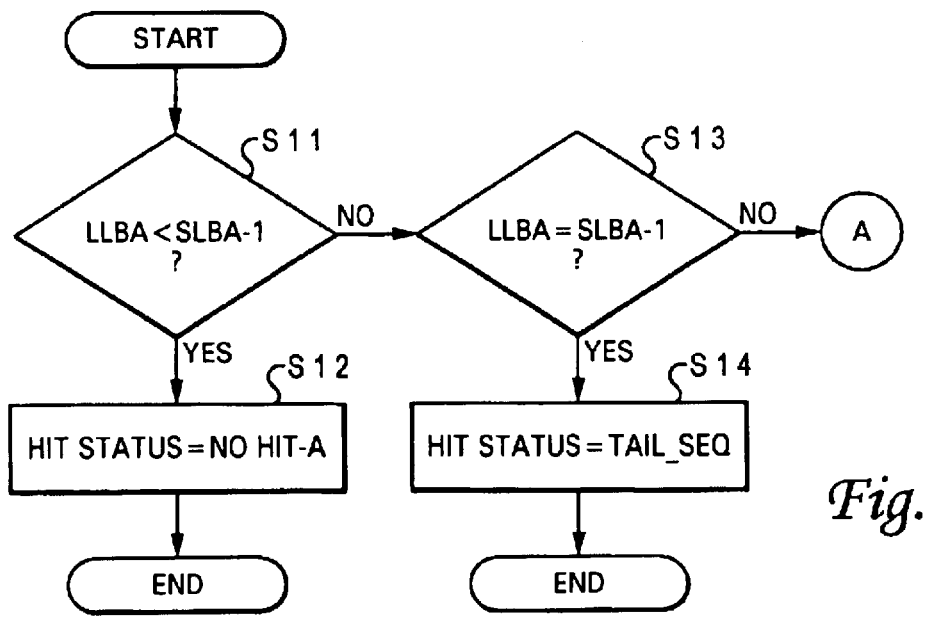
FIG. 4 illustrates a first section of a high-level logic flowchart of a method for determining a relationship between buffer data and the write commands in accordance to a preferred embodiment of the present invention.
Figure 5:
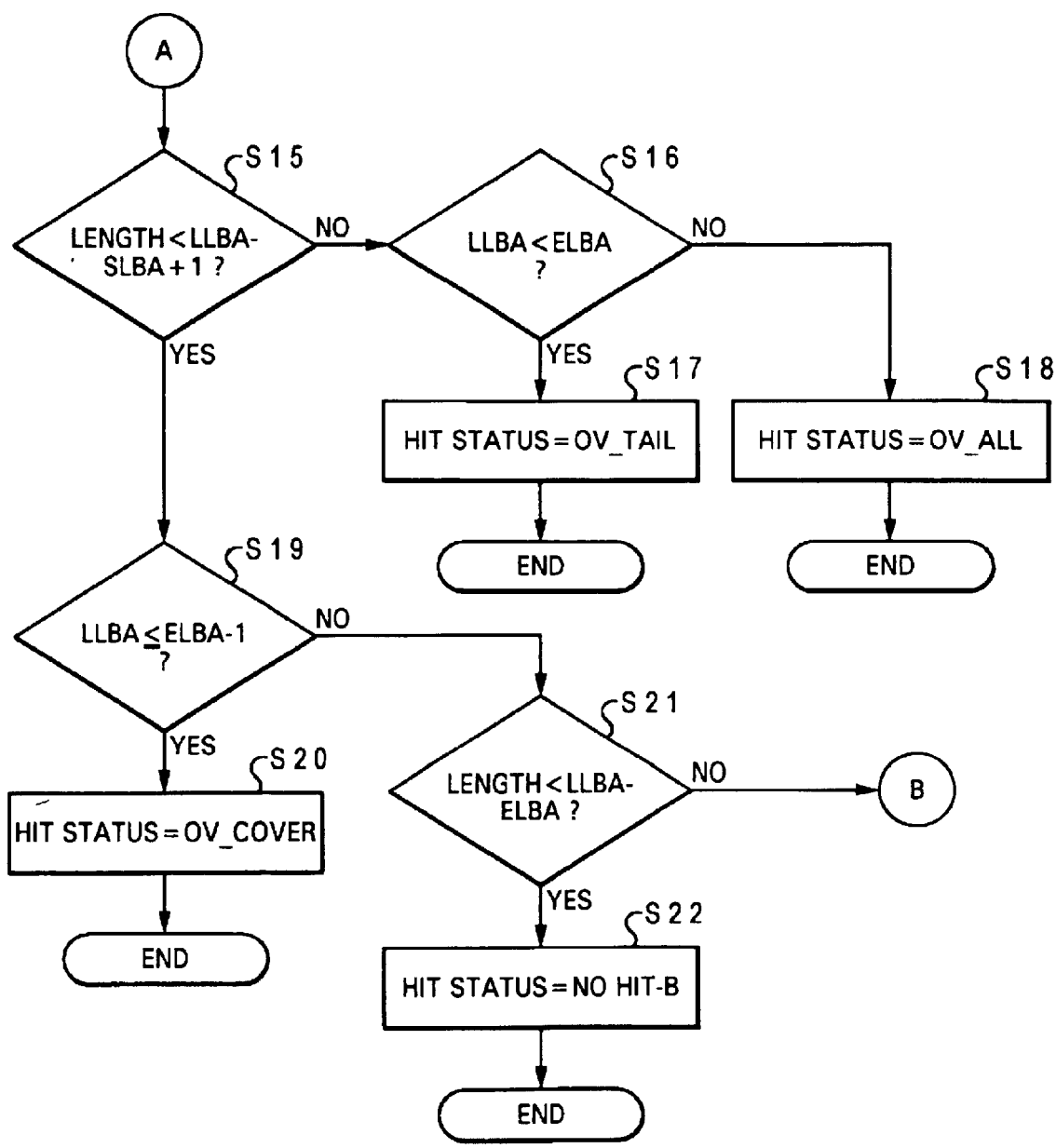
FIG. 5 depicts a second section of a high-level logic flowchart of a method for determining a relationship between buffer data and the write commands in accordance to a preferred embodiment of the present invention.
Figure 6:
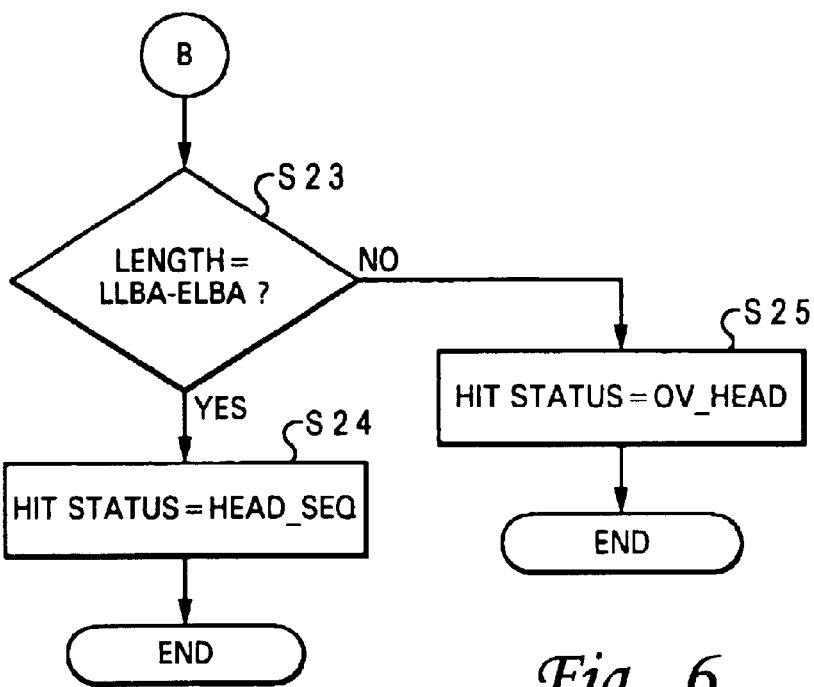
FIG. 6 illustrates a third section of a high-level logic flowchart of a method for determining a relationship between buffer data and the write commands in accordance to a preferred embodiment of the present invention.

In FIG. 4 through FIG. 6, it is determined whether or not $LLBA<SLBA-1$ is satisfied, as illustrated in step S11. If $LLBA<SLBA-1$ is satisfied, the process continues to step S12, where a depiction of the determination that the hit status is NO HIT-A is shown. In step S11, it is illustrated that the LBA at the tail of buffer data are compared with the LBA at the head of a write command. If $LLBA<SLBA-1$ is satisfied, the hit status is determined to be NO HIT-A, as depicted in step S12, since there is no portion where the LBA of the buffer data is overlaid on that of the write command. The "A" denotes that the write command exists at the tail of the buffer data.

In step S13, it is decided whether or not $LLBA=SLBA-1$, which represents whether or not the LBA at the head of the write command overlaps the LBA at the tail of the buffer data. If the LBA at the head of the write command overlaps the LBA at the tail of the buffer data, the hit status is determined to be TAIL_SEQ, as illustrated in step S14. If $LLBA=SLBA-1$ is not satisfied, the process continues to step S15 as depicted in FIG. 5.

As illustrated in step S15, there is a determination of whether or not $LENGTH<LLBA—SLBA+1$. If $LENGTH<LLBA-SLBA+1$, the process continues to step S19. Otherwise, The process continues to step S16.

A determination of whether or not $LLBA<ELBA$ is made, as depicted in step S16. If $LLBA<ELBA$, the process continues to step S17, where it is illustrated that the hit status is determined to be OV_TAIL. Otherwise, the process continues to step S18, where it is depicted that the hit status is determined to be OV_ALL.

Next, a determination of whether or not $LLBA \leq ELBA$ is made, as depicted in step S19. If $LLBA \leq ELBA$ is not valid, the process continues to step S20, where a determination of the hit status as OV_COVER is illustrated. Otherwise, the process continues to step S21.

A determination of whether or not LENGTH<LLBA−ELBA is depicted in step S21. If LENGTH<LLBA−ELBA, the process continues to step S22, where it is illustrated that the hit status is determined to be NO HIT-B. If LENGTH<LLBA−ELBA is not valid, the process continues to step S23, as depicted in FIG. 6.

As illustrated in step S23, it is determined whether or not LENGTH=LLBA−ELBA, as illustrated. If LENGTH=LLBA−ELBA, the hit status is determined to be HEAD_SEQ. Otherwise, the hit status is determined to be OV_HEAD. This completes the descriptions of the first stage determinations.

Next, the decisions made in the second stage will be described with reference to FIG. 7 through FIG. 14.

<NO HIT-A>

Figure 7:
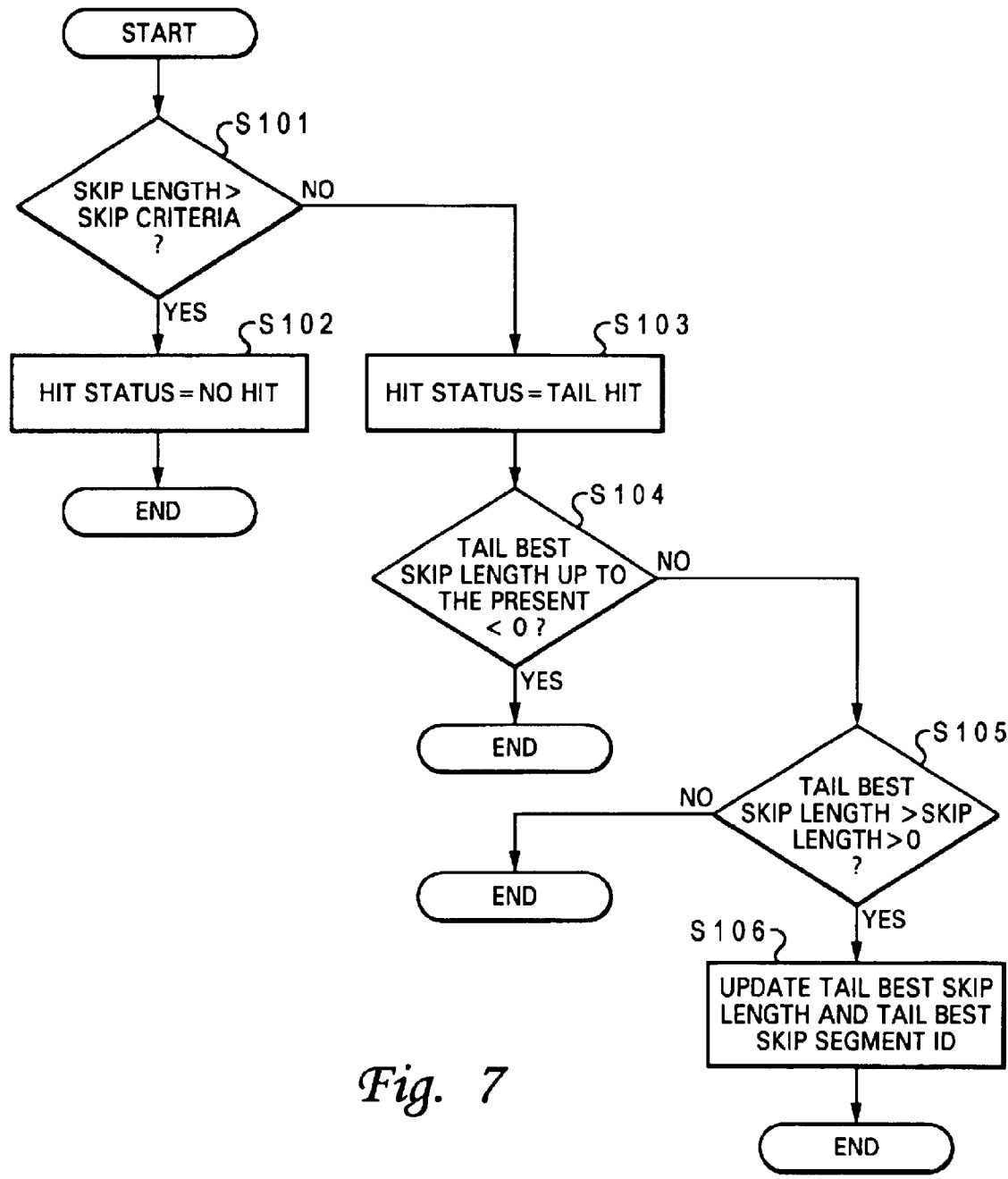
FIG. 7 depicts a high-level logic flowchart of a process that is carried out after a relationship between buffer data and a write command is determined to be NO HIT-A in accordance to a preferred embodiment of the present invention.

If the hit status is designated as NO HIT-A, the process continues as depicted in FIG. 7. As illustrated in step S101, it is determined whether or not the skip length (SKIP LENGTH) is larger than the skip criteria (SKIP CRITERIA). The skip length represents a value defined as LLBA−SLBA+1 and denotes a distance between the tail of buffer data and the head of a write command.

If the skip length is larger than the skip criteria, the hit status of the write command with respect to the buffer data is determined to be NO HIT, as depicted in step 102. This hit status represents a determination that the head of the write command is separated from the tail of the buffer data by a distance larger than the skip criteria, which is a predetermined distance. Also, when the hit status is determined to be NO HIT, continuous data writing is not performed during a data write command, since no relationship is recognized between the buffer data and the write command.

If the skip length is less than the skip criteria, the relationship between the write command and the buffer data is determined to be TAIL HIT, as illustrated in step S103. The write command is separated from the buffer data, but the separation distance is under a predetermined value, referred to as the skip criteria. Consequently, the data are considered as continuous data, and the data of associated with the two write commands are written on adjacent tracks. The RPO is effective in improving the performance of the hard disk drive unit. This process mirrors the process that would be performed if it is determined that the hit status determined to be NO HIT-B.

If the hit status is determined to be TAIL HIT, it is further decided whether or not the TAIL BEST SKIP LENGTH up to the present is less than 0 in step S104, as illustrated. If the TAIL BEST SKIP LENGTH is less than 0, the process ends. Otherwise, a determination of whether or not the SKIP LENGTH this time is less than the TAIL BEST SKIP LENGTH as illustrated in step S105. If SKIP LENGTH this time is less than the TAIL BEST SKIP LENGTH, SKIP LENGTH is designated as the TAIL BEST SKIP LENGTH as depicted in step S106 and both TAIL BEST SKIP LENGTH and TAIL BEST SKIP SEGMENT ID are updated. Otherwise, the process ends.

Figure 20:
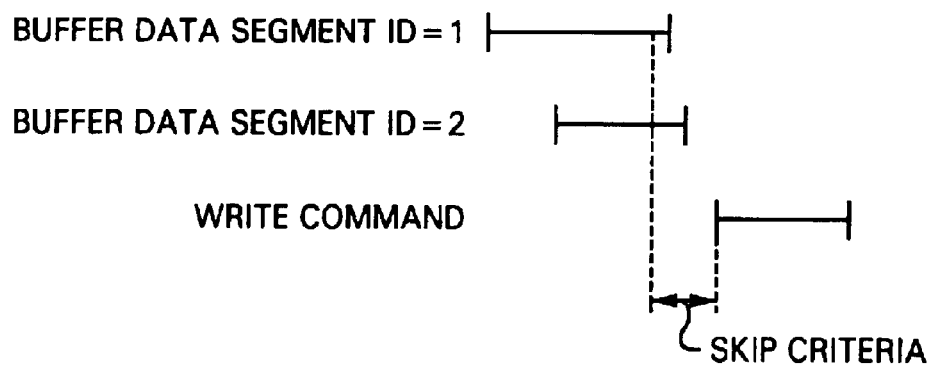
FIG. 20 illustrates a chart depicting a BEST TAIL SKIP LENGTH hit status in accordance to a preferred embodiment of the present invention.

The TAIL BEST SKIP LENGTH will now be described with reference to FIG. 20. As depicted in FIG. 20, the hit status of a write command is designated as TAIL HIT. However, it is apparent that the SKIP LENGTH denotes that the buffer data whose segment ID is 2 is smaller than the buffer data whose segment ID is 1. In this case, the TAIL BEST SKIP LENGTH of the write command is assumed to be the SKIP LENGTH from the buffer data whose segment ID is 2. Then, the TAIL SKIP SEGMENT ID becomes 2. Both of the TAIL BEST SKIP LENGTH and the TAIL SKIP SEGMENT ID are stored in the table illustrated in FIG. 16.

<TAIL_SEQ>

Figure 8:
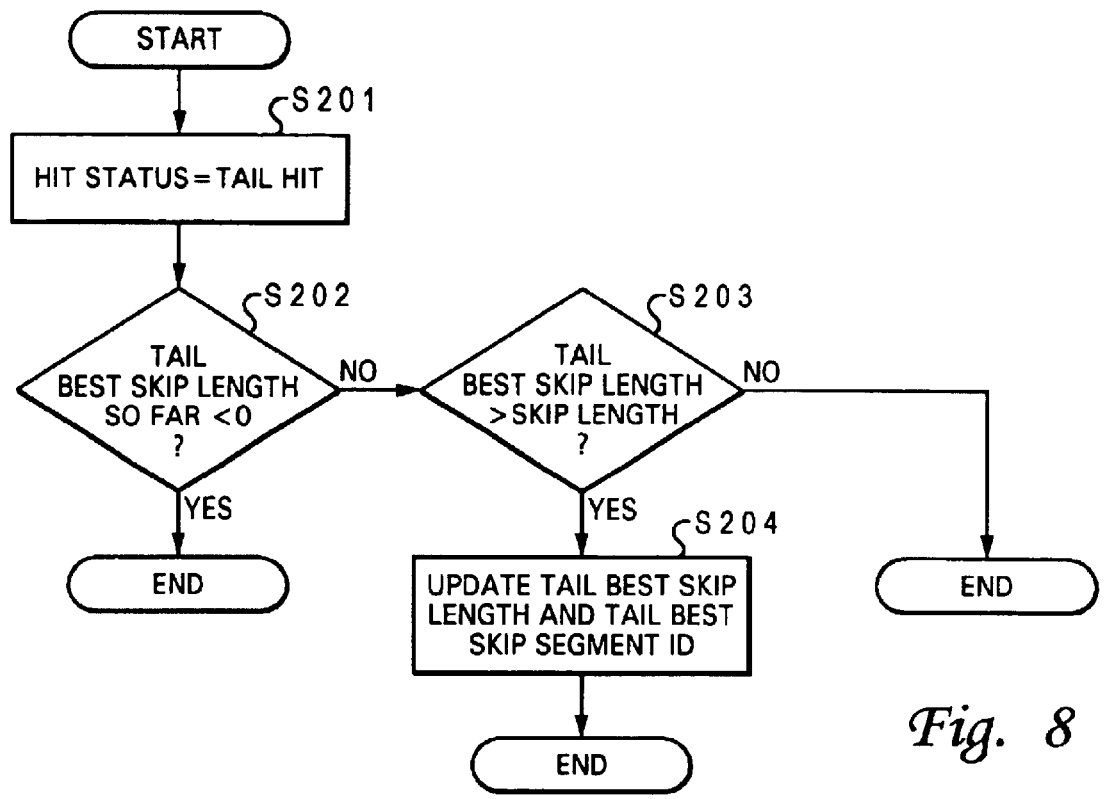
FIG. 8 illustrates a high-level logic flowchart for a process that is carried out after a relationship between buffer data and a write command is determined to be TAIL_SEQ in accordance to a preferred embodiment of the present invention.

If the hit status is determined to be as TAIL_SEQ, the process follows the method depicted in the high-level logic flowchart illustrated in FIG. 8.

If a determination of TAIL_SEQ is made, the hit status is further determined as TAIL HIT, as illustrated in step S201. Then, a determination of whether or not the TAIL BEST SKIP LENGTH up to the present is less than 0, as depicted in step S202. If TAIL SKIP LENGTH up to the present is less than 0, the process ends. Otherwise, it is determined whether or not the SKIP LENGTH is smaller than the TAIL BEST SKIP LENGTH, as illustrated in step S203. If SKIP LENGTH is smaller than the TAIL BEST SKIP LENGTH, both of the TAIL BEST SKIP LENGTH and the TAIL BEST SKIP SEGMENT ID are updated, as depicted in step S204.

<OV_TAIL>

Figure 9:
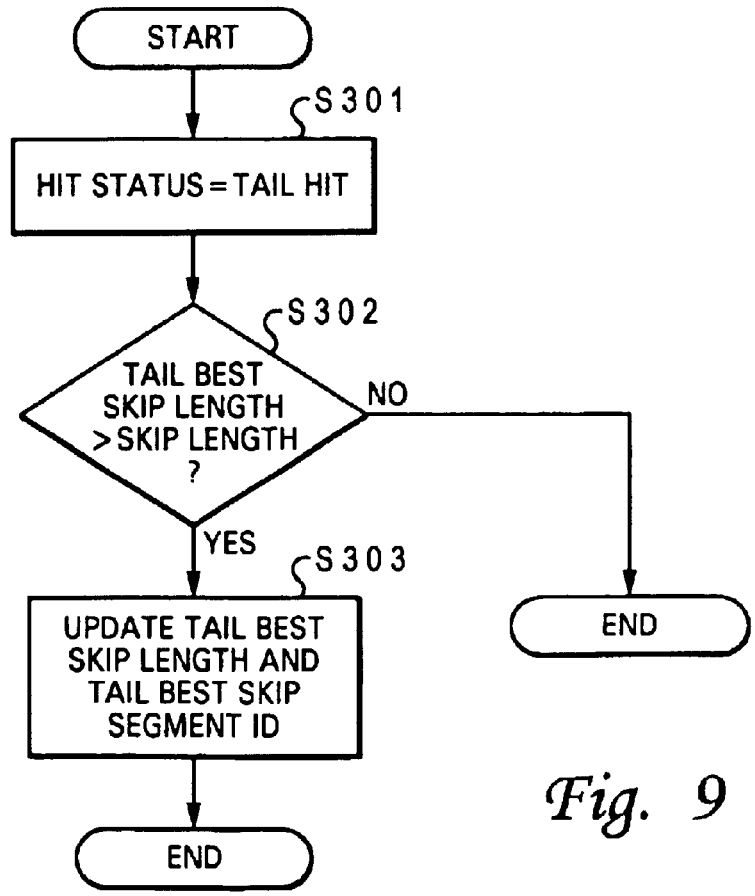
FIG. 9 depicts a high-level logic flowchart for a process that is carried out after a relationship between buffer data and a write command is determined to be OV_TAIL in accordance to a preferred embodiment of the present invention.

If the hit status is determined to be OV_TAIL, the process follows the method depicted in the high-level logic flowchart illustrated in FIG. 9.

Initially, the hit status is determined to be TAIL HIT, as depicted in step S301. Then, a determination is made whether or not the SKIP LENGTH is smaller than the TAIL BEST SKIP LENGTH, as illustrated in step S302. If the SKIP LENGTH is smaller than the TAIL BEST SKIP LENGTH, both of the TAIL BEST SKIP LENGTH and the TAIL BEST SKIP SEGMENT ID are updated, as depicted in step S303. Otherwise, the process ends.

<OV_ALL>

Figure 10:
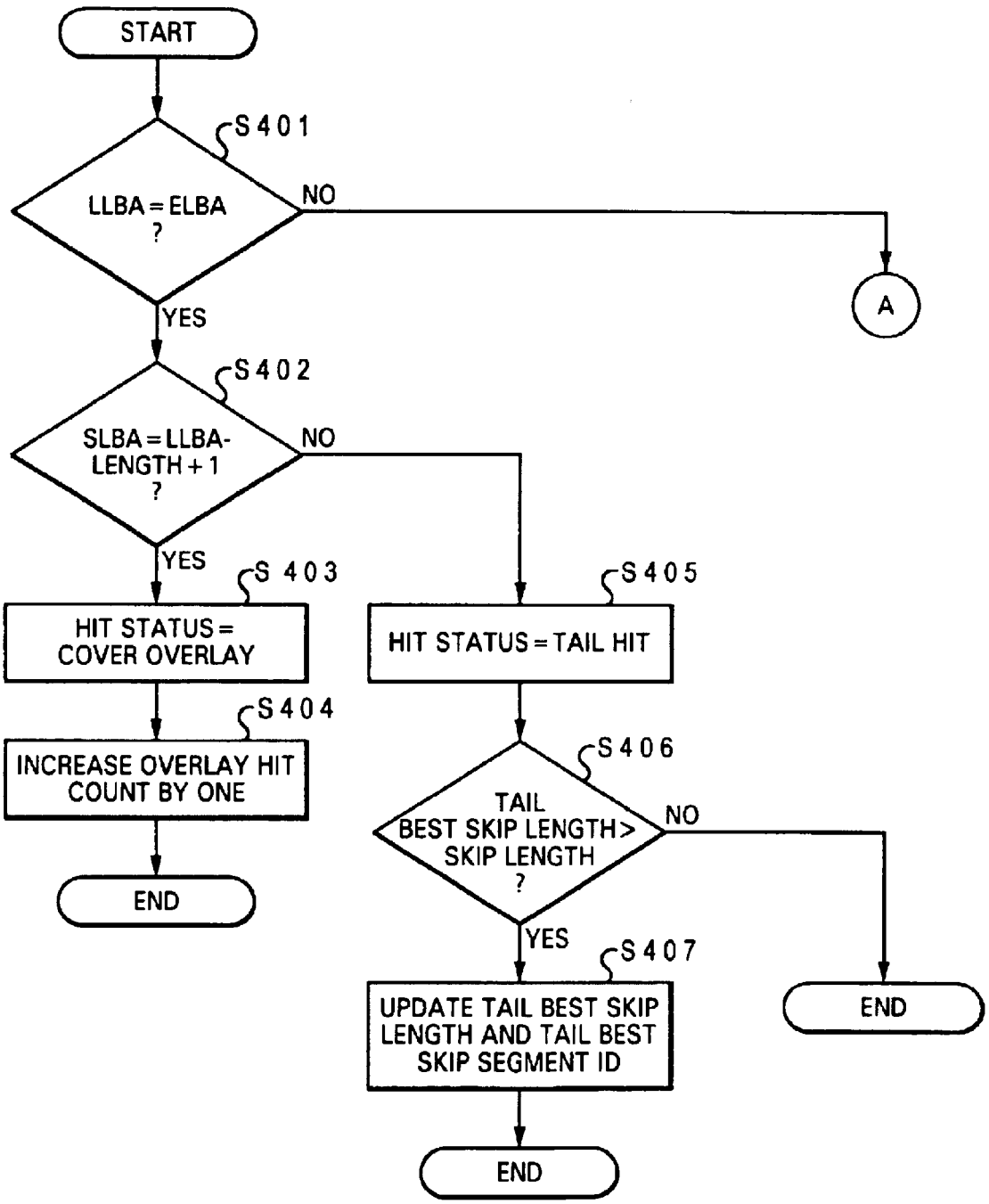
FIG. 10 illustrates a high-level logic flowchart for a process to be carried out after a relationship between buffer data and a write command is determined to be OV_ALL in accordance to a preferred embodiment of the present invention.
Figure 11:
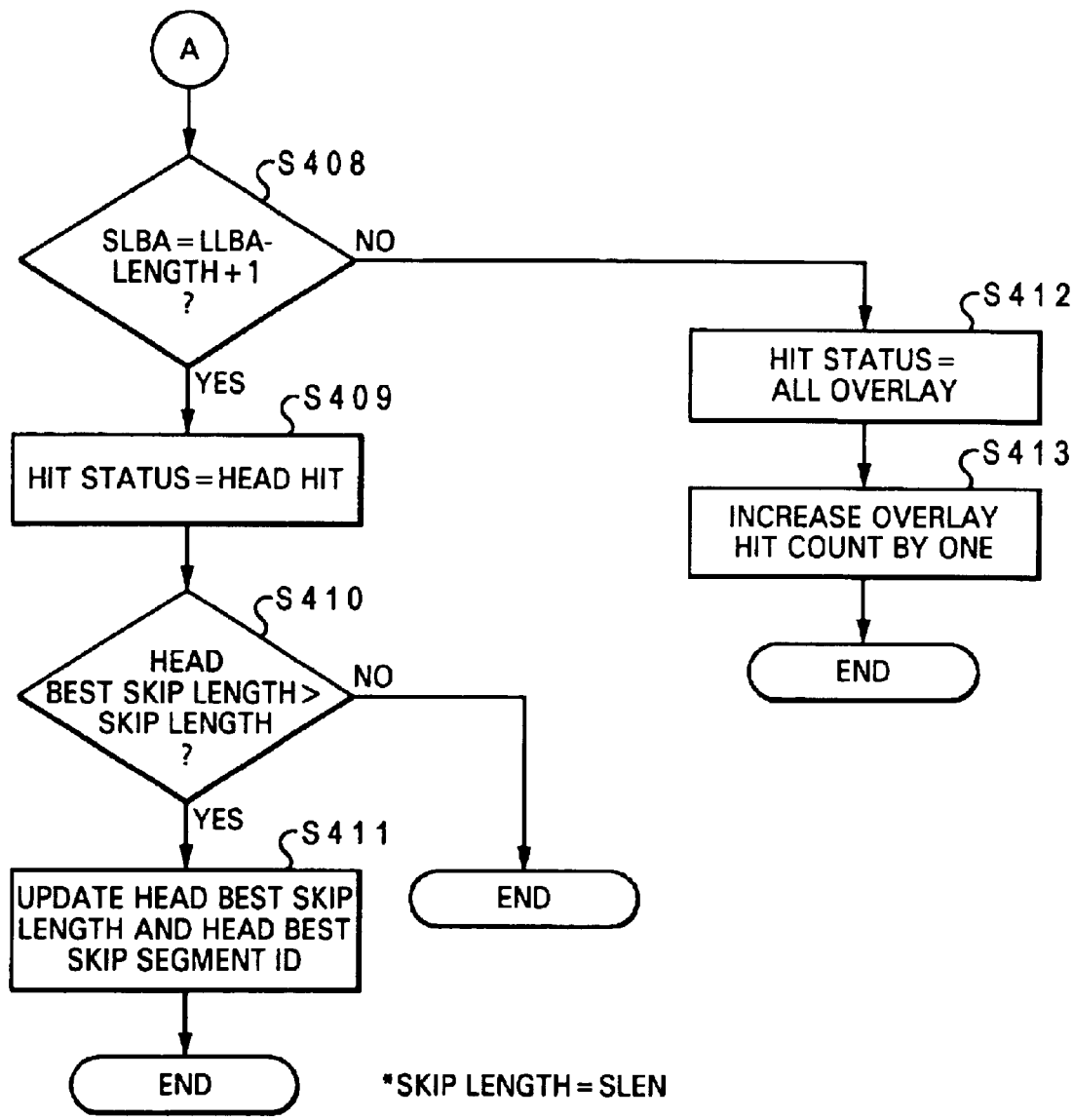
FIG. 11 depicts a high-level logic flowchart for a process that is carried out after a relationship between buffer data and a write command is determined to be OV_ALL in accordance to a preferred embodiment of the present invention.

If the hit status is determined to be OV_ALL, the process follows the method depicted in the high-level flowchart depicted in FIG. 10 and FIG. 11.

Initially, as illustrated in step S401, it is determined whether or not LLBA equals with ELBA. If LLBA and ELBA are equal, the process continues to step S402. Otherwise, the process continues to step S408, as illustrated in FIG. 11.

As depicted in step S402, it is determined whether or not SLBA=LLBA−LENGTH+1. If SLBA=LLBA−LENGTH+1, the process continues to step S403. Otherwise, the process continues to step S405.

As illustrated in step S404, it is determined that the hit status is COVER OVERLAY, if it is also determined in the step depicted in step S402 that SLBA equals to the LBA at the head of buffer data. Then, the overlay hit (OVERLAY HIT) count is increased by one, as illustrated in step S404.

As depicted in step S405, the hit status is determined to be TAIL HIT. Then, it is determined whether or not SKIP LENGTH is smaller than TAIL BEST SKIP LENGTH as illustrated in step S406. If SKIP LENGTH is smaller than TAIL BEST SKIP LENGTH, the TAIL BEST SKIP LENGTH and the TAIL BEST SKIP SEGMENT ID are both updated, as depicted in step S407. Otherwise, the process ends.

As illustrated in step S408, it is determined whether or not SLBA=LLBA−LENGTH+1. If SLBA=LLBA−LENGTH+1, the process continues to step S409. Otherwise, the process continues to step S412.

As illustrated in step S409, the hit status is determined as HEAD HIT. Then, it is determined whether or not the SKIP LENGTH (SLEN in this case) is less than the HEAD BEST SKIP LENGTH, as depicted in step S410. If SKIP LENGTH (SLEN in this case) is smaller than the HEAD BEST SKIP LENGTH, the process continues to step S411. Otherwise, the process ends.

As depicted in step S411, the HEAD BEST SKIP LENGTH and the HEAD BEST SKIP SEGMENT ID are both updated. Then, the process ends.

As illustrated in step S412, the hit status is determined to be ALL OVERLAY. Then, the overlay hit count is increased by one, as illustrated in step S413 and the process ends. The overlay hit count is increased in the NO OF HIT cell of the table illustrated in FIG. 16.

<OV_COVER>

Figure 12:
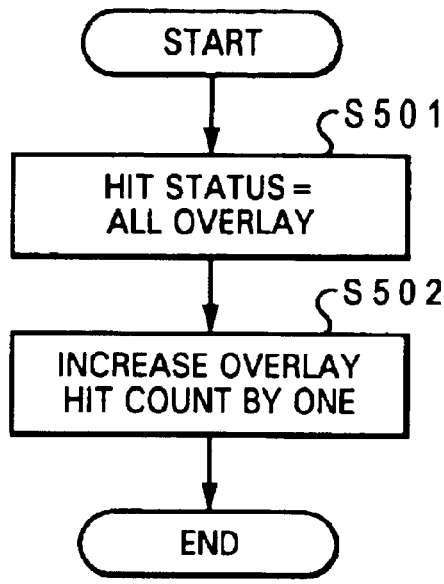
FIG. 12 illustrates a high-level logic flowchart for a process to be carried out after a relationship between buffer data and a write command is determined to be OV_COVER in accordance to a preferred embodiment of the present invention.

If the OV_COVER decision is made, the hit status is determined as ALL OVERLAY, as depicted in step S501 of FIG. 12, then the overlay hit count is increased by one, as illustrated in step S502. The process then ends.

<OV_HEAD>

Figure 13:
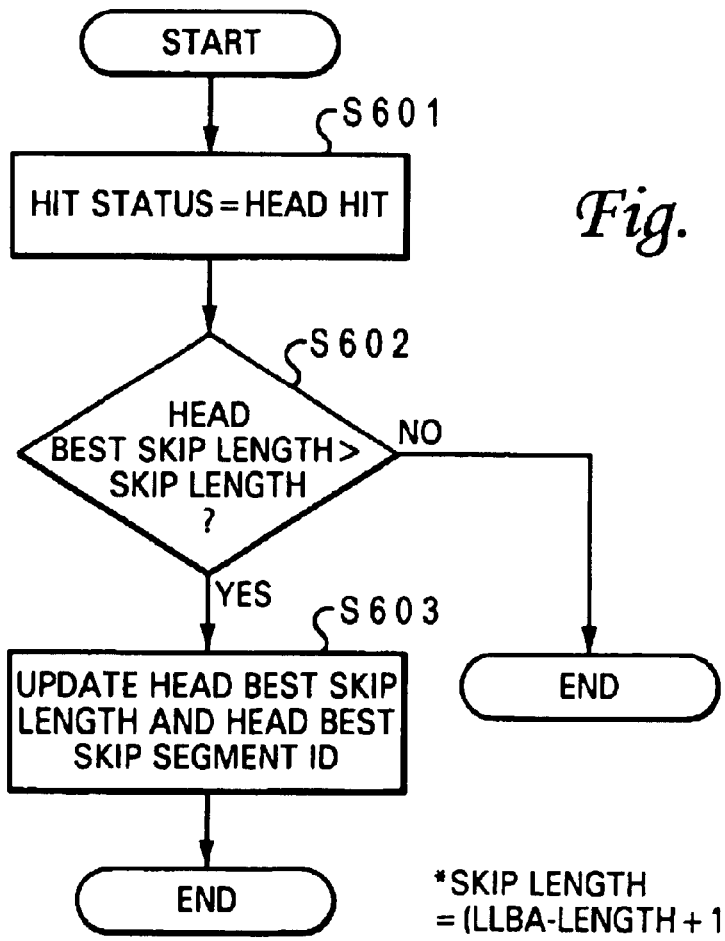
FIG. 13 depicts a high-level logic flowchart for a process to be carried out after a relationship between buffer data and a write command is determined to be OV_HEAD in accordance to a preferred embodiment of the present invention.

If the OV_HEAD decision is made, the process follows the method illustrated in the high-level logic flowchart depicted in FIG. 13.

Then, the hit status is determined to be HEAD HIT, as illustrated in step S601. Then, it is determined whether or not the SKIP LENGTH ((LLBA−LENGTH+1)−ELBA in this decision) is smaller than the HEAD BEST SKIP LENGTH, as shown in step S602. If SKIP LENGTH ((LLBA−LENGTH+1)−ELBA in this decision) is less than the HEAD BEST SKIP LENGTH, the HEAD BEST SKIP LENGTH and the HEAD BEST SKIP SEGMENT ID are both updated, as illustrated in step S603. Otherwise, the process ends.

<HEAD_SEQ>

Figure 14:
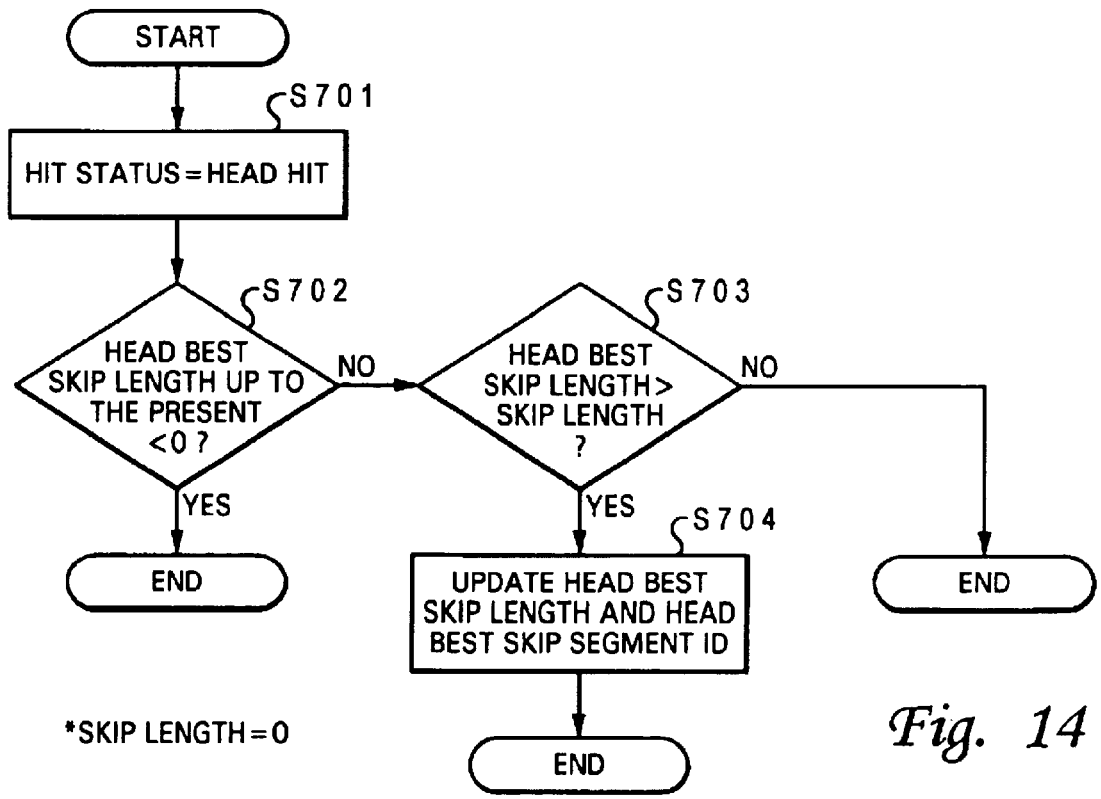
FIG. 14 illustrates a high-level logic flowchart for a process that is carried out after a relationship between buffer data and a write command is determined to be HEAD_SEQ in accordance to a preferred embodiment of the present invention.

If the HEAD_SEQ decision is made, the process follows the high-level logic flowchart illustrated in FIG. 14. The hit status is then determined to be HEAD HIT, as depicted in step S701. Then, it is determined whether or not the BEST HIT SKIP LENGTH up to the present is negative, as illustrated in step S702. If the BEST HIT SKIP LENGTH up to the present is negative, the process ends. Otherwise, the process continues to step S703.

As illustrated in step S703, it is determined whether or not the SKIP LENGTH is less than the HEAD BEST SKIP LENGTH. The value of SKIP LENGTH at this time is zero. In case the SKIP LENGTH is smaller than the HEAD BEST SKIP LENGTH, the HEAD BEST SKIP LENGTH and the HEAD BEST SKIP SEGMENT ID are both updated, as depicted in step S704, and the process ends.

<NO HIT-B>

Figure 15:
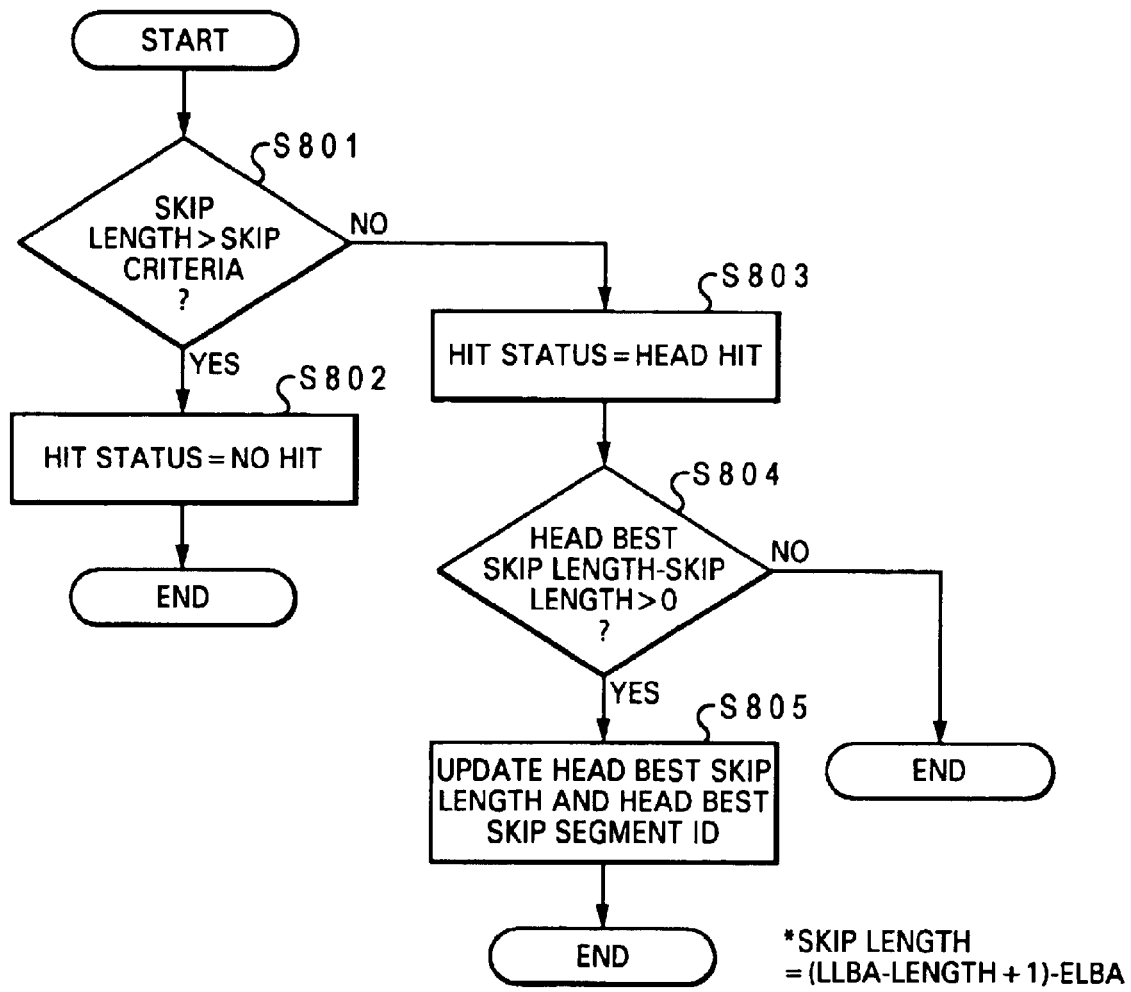
FIG. 15 depicts a high-level logic flowchart for a process that is carried out after a relationship between buffer data and a write command is determined to be NO HIT-B in accordance to a preferred embodiment of the present invention.

If the NO HIT-B decisions is made, the process follows method depicted in the high-level logic flowchart, as illustrated in FIG. 15. More specifically, it is determined whether or not (LLBA−LENGTH+1)-ELBA is larger than SKIP CRITERIA, as depicted in step S801. If SKIP LENGTH is larger than SKIP CRITERIA, the hit status is determined to be NO HIT, as illustrated in step S802.

If SKIP LENGTH is less than SKIP CRITERIA, the hit status is determined as HEAD HIT, as depicted in step S803, and the process continues to step S804. As illustrated in step S804, it is determined whether or not the SKIP LENGTH is less than the HEAD BEST SKIP LENGTH. The SKIP LENGTH in this case is defined as (LLBA−LENGTH+1)-ELBA. If HEAD BEST SKIP LENGTH is not larger than the SKIP LENGTH, the process ends. In case the SKIP LENGTH is less than the HEAD BEST SKIP LENGTH, both HEAD BEST SKIP LENGTH and the HEAD BEST SKIP SEGMENT ID are updated, as illustrated in step S805, and the process is ends.

Figure 21:
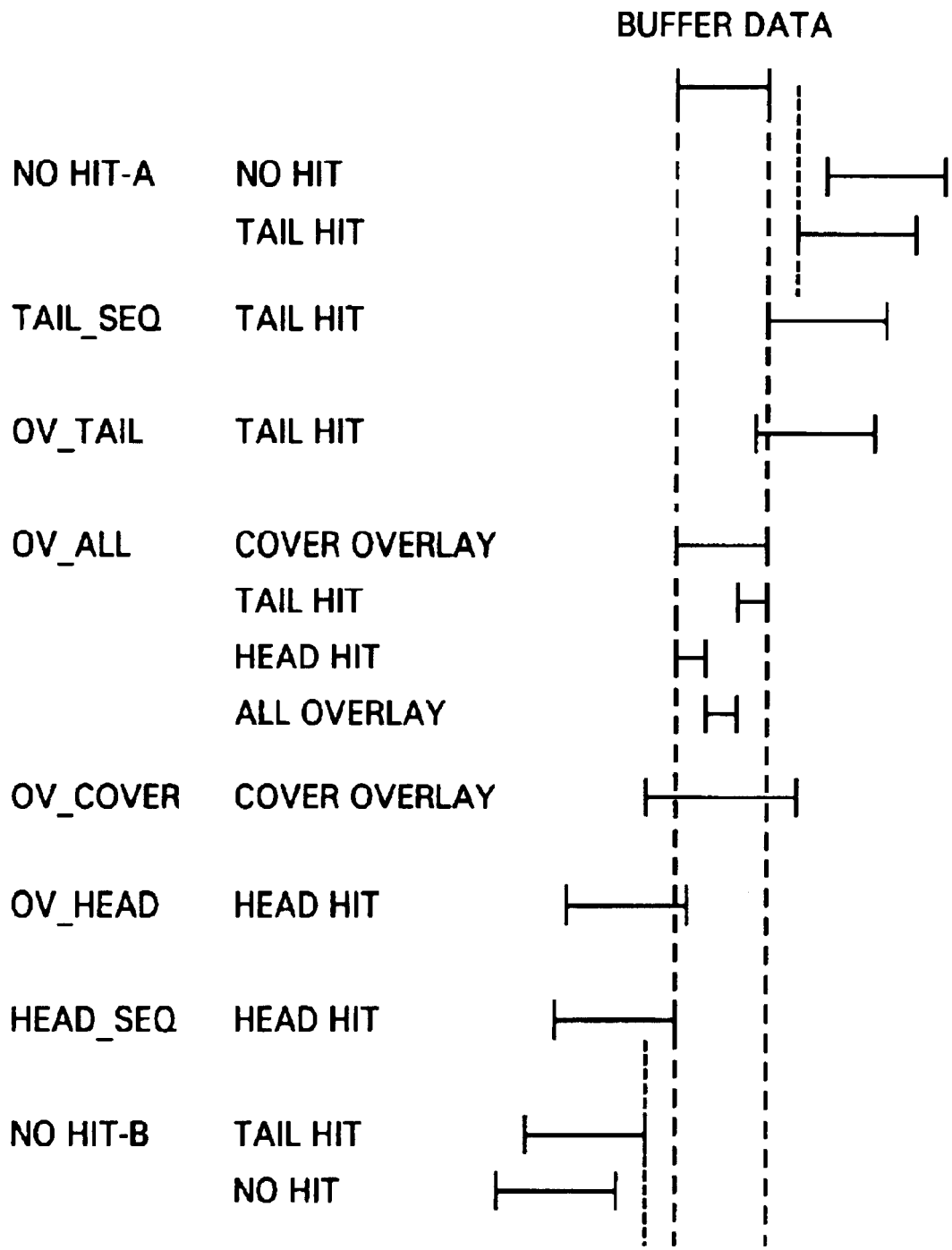
FIG. 21 depicts a chart for illustrating a relationship between buffer data and each hit status decided in FIG. 7 through FIG. 15 in accordance to a preferred embodiment of the present invention.

As described above, when a new write command is accepted, the hit status is determined and the order of the write commands is updated according to the determined hit status. If the hit status is determined to be NO HIT, no relationship is recognized between the new write command and the queued write command. Thus, the write command execution order is not updated. If another hit status is determined, a relationship is recognized between the new write command and the queued write command. FIG. 21 depicts the positional relationship between each of NO HIT-A, TAIL_SEQ, OV_TAIL, OV_ALL, OV_COVER, OV_HEAD, HEAD_SEQ, and NO HIT-B and each hit status determined as illustrated in FIG. 7 through FIG. 15, which includes the positional relationship with buffer data.

The above decisions are made each time host 40 issues a write request by the segment handler (SG) that accesses the segment table in RAM 33 via the memory manger (MM). Write segments which configure a segment table, are configured by four words as depicted in FIG. 16. The first and second words represent the LBA and the third word characterizes the block length (LENGTH). The fourth word further represents the hit status.

The hit status stored in each write segment is reflected on the RPO when specifying the execution of an actual write process (step S905). The actual write process is executed separately from processes depicted in S901 to S907 in the flow (step S910).

As depicted in step S910, the RPO, when having executed a queued command, begins seeking a target track on magnetic disk 21 and estimates both a seek time and a rotational latency. The RPO then selects a queued command that requires the smallest total value of the seek time and the latency as the next command to be executed.

In a preferred embodiment of the present invention, the hit status stored in a write segment is referenced as described above. Write commands are selected from multiple queued write commands. The write commands with a hit status other than NO-HIT are executed as a group of write commands with associated write data written to adjacent tracks.

Because sixty-four sets of write segments are prepared in a preferred embodiment of the present invention as described above, there might be multiple command groups found among those sixty-four sets. If multiple command groups exist, a command group that is assigned the lowest total value of the seek time and the rotational latency from the conventional RPO method takes precedence in the order of execution. Of course, there might be individual write commands that do not belong to any command group. These individual write commands are also compared with the multiple command groups when utilizing the conventional RPO method to determine the execution order of the write commands.

With reference to FIG. 18a, multiple commands (1) to (6) to be executed in response to write requests from host 40 are depicted. The numbers (1) to (6) denotes the order of the write requests issued from host 40. Write data corresponding to each command is stored in the cache memory (buffer memory) in the order that the write requests are issued, so the numbers (1) to (6) also correspond to the addresses (pages) of the cache memory. The horizontal axis denotes the LBA.

As depicted in FIG. 18a, it is determined that the commands (1) and (3) and the commands (2) and (5) are included in a data group according to the result of comparison between LBAs described above. However, each of the commands (4) and (6) is not related to other commands, thereby its hit status is determined to be NO HIT. Consequently, the commands (1) to (6) can be replaced with six data groups (A) to (D) as shown in FIG. 18b. And, the write command execution order is changed to A, B, C, D. Furthermore, the writing order sent from host 40 is ignored.

Figure 19:
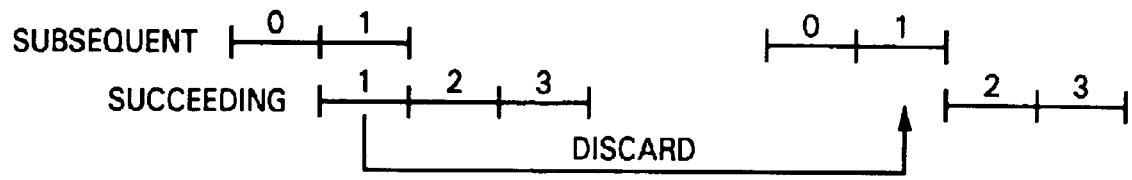
FIG. 19 depicts a chart illustrating a method of writing data when a hit status is determined to be OVERLAY HIT in accordance to a preferred embodiment of the present invention.

As illustrated in FIG. 19, it is assumed that the LBAs of the present write requesting commands (buffer data) are 1, 2, and 3, and the LBAs of the subsequent write requesting commands (write commands) are 0 and 1. The hit status of a write command with respect to buffer data is OVERLAY HIT. The command and the buffer data are thus overlapping in the LBA1 block. If the buffer data are written after the write command is executed simply according to the RPO method at this time, the buffer data are written over the write command data in the LBA1 block. And, because the buffer data are older than the write command data, the old data are overwritten on the new data.

In a preferred embodiment of the present invention, it is possible to erase or discard the buffer data from the overlaid block as shown on the right side in FIG. 19. After this, it is possible to write buffer data, then write the write command. Consequently, new data are also written in the overlaid block.

Write commands are executed in sequence as described above, thereby write data stored in RAM 33 is written on recording medium 21 (step S910). If the conventional technique is utilized because a command complete signal is issued in response to a new write command when write data are stored in the buffer area (RAM 33) as long as the cache or the buffer memory (RAM 33) has free space available, the subsequent write commands are sent from host 40 in succession. The write commands sent in succession are processed as described above in parallel to the actual writing process for the medium (step S910).

On the other hand, when data are written on recording medium 21, the data stored in RAM 33 becomes outdated and should be purged. If RAM 33 is implemented as a ring cache memory, the data in the buffer memory is not always discarded sequentially each time data are written from RAM 33 onto recording medium 21.

For example, assume now that data are written in the cache sequentially in order of data groups A, B, C, and D as shown in FIG. 18b while a cache start address pointer is positioned at the head of the data (1) as shown in FIG. 18a. Then, the cache area in which data (6) is stored is not discarded even when data (6) of the data group A are written on recording medium 21. The cache start address pointer thus remains at the head of the data (1). When data (1) of the data group B are written on the recording medium 21, the data (1) becomes outdated. Thus, the cache start address pointer goes to the head of the data (2). At this time, the cache space corresponding to the data (1) are discarded for the first time. The cache start address pointer still remains at the head of the data (2) even when the writing further proceeds so as to write the data (3) and the data (4) of the data group C. When the data (2) of the data group D are written, however, the cache start address pointer goes to the head of the data (5). Consequently, the cache space corresponding to the data items (2), (3), and (4) that have already written on the recording medium 21 and become outdated now is purged. More specifically, if a previously received write command is moved to the end in the execution order by the RPO, no cache area is purged unless the data corresponding to the earlier-accepted write command is actually written on recording medium 21. The same situation also arises for data belonging to a data group.

While the buffer memory has enough free space, no problem arises. However, if the buffer memory is occupied and no data can be written in response to a new write command, the cache memory does not accept further write commands to prevent the an overflow of the buffer memory. A command complete signal issued to allow the buffer memory to accept a new write command must be suspended until data in the memory are actually written on recording medium 21 in response to a write command accepted earlier, thereby freeing some cache space in the buffer memory.

In a preferred embodiment of the present invention, the free space of the buffer memory is monitored. And, when the available free space becomes smaller than a predetermined reference value, a command complete signal is not issued until the actual writing of data in the memory onto recording medium 21 is completed (step S910). If the hit status is determined to be other than NO HIT (that is, it is determined that the accepted write command is related to a queued write command), a command complete signal is issued regardless of the existence of a free space in the buffer memory to enable the next command to be accepted. With reference to FIG. 22, the actual process is as follows. After an actual writing process is specified (step S905), both of the first and second conditions are determined (step S906). The first condition denotes that the buffer free space exceeds a predetermined reference value and the second condition denotes that the hit status is not NO HIT. And, if either the first condition or the second condition is satisfied, a command complete signal is issued to the command accepted, as depicted in step S901 (step S907). Otherwise, the process returns to step S905.

Including a decision step suspends the issue of a command complete signal until the buffer memory makes a predetermined free space available. It is thus possible to prevent the performance of the hard disk drive unit from degradation, which is caused by a full buffer memory.

A preferred embodiment of the present invention not only secures a free space larger than a predetermined reference value in the buffer memory, but also issues a command complete signal even when the buffer free space is smaller than the reference value if an accepted write command is related to a queued write command. This is because processing occurs for each above-described hit status if a currently accepted command (new command) is related to a queued command (that is, the hit status is not NO HIT). It is expected that the performance is improved significantly. If a NO HIT decision is made, it is not expected that the performance of the disk drive unit is improved. On the contrary, the above described problem might possibly arise if the processing of an accepted command is relocated to the end as a result of updating of the write command execution order by the RPO. In order to avoid such the problem, therefore, the actual writing process (step S910) takes precedence to secure a free space enough in the buffer memory if the hit status of a new command is NO HIT and the free space available is under the reference value. After a command complete signal is issued in response to the current write command, external device 40 can send the next write command.

As described above, according to a preferred embodiment of the present invention, it is possible to secure free space in the buffer memory to a certain extent, preventing the performance of the disk drive unit from degradation, caused by a fall buffer memory.

Figure 23:
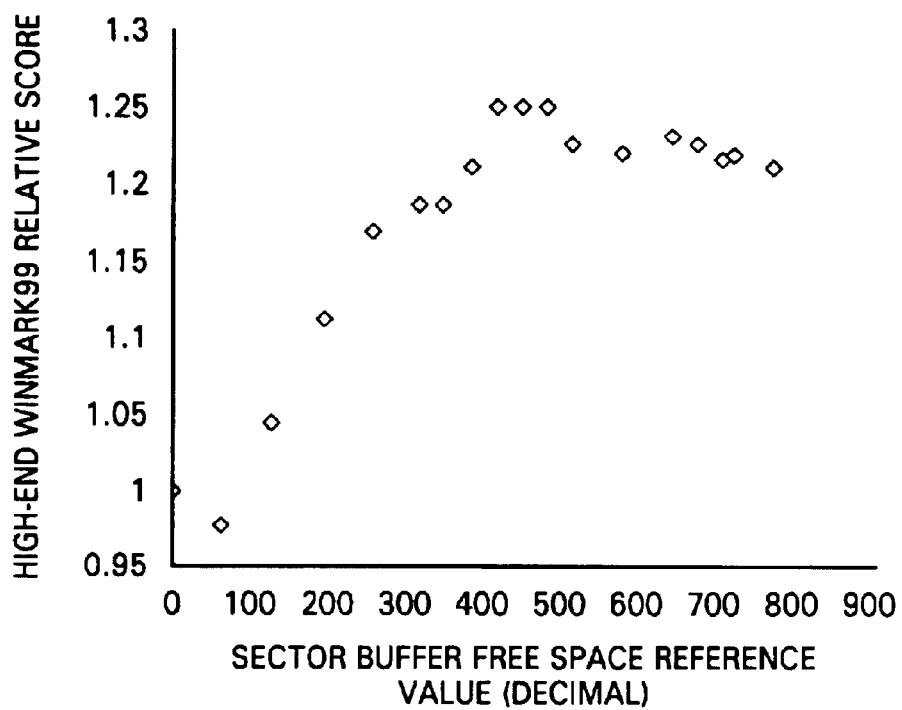
FIG. 23 depicts a graph for denoting a set of relative scores in a high-end suite benchmark test when a reference value of a buffer free space is changed in accordance to a preferred embodiment of the present invention.
Figure 24:
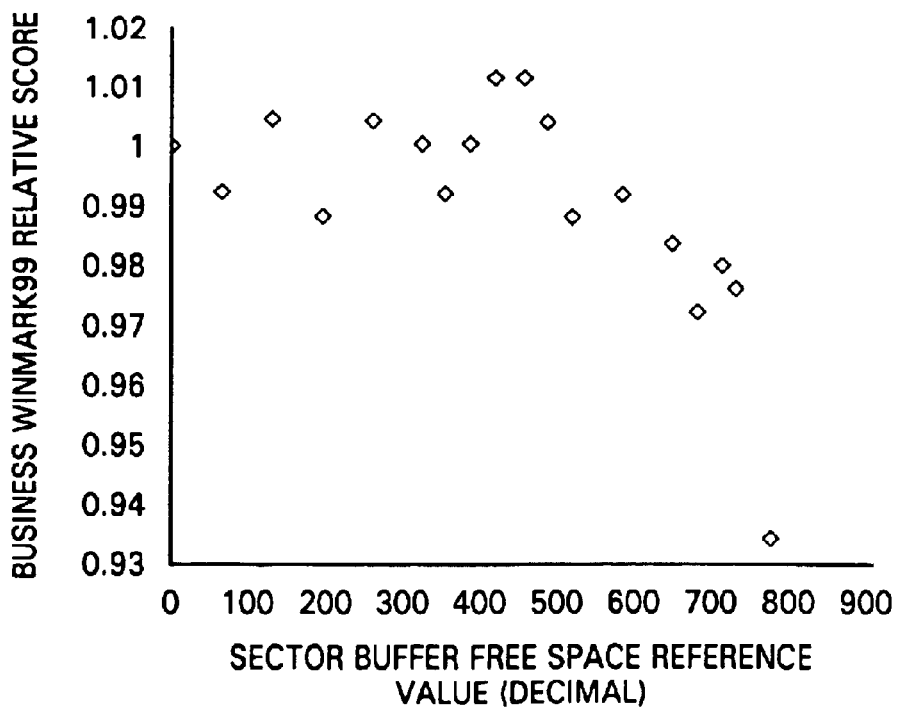
FIG. 24 illustrates a graph for denoting a set of relative scores in a business suite benchmark test when the reference value of the buffer free space is changed in accordance to a preferred embodiment of the present invention.

With reference to FIG. 23 and FIG. 24, there are depicted graphs indicating the relative scores of a benchmark test when the reference value of the buffer free space is changed. FIG. 23 shows the result of a high performance benchmark test and FIG. 24 depicts the result of a business application benchmark test. The above benchmark tests utilize "WinMark 99" in "WinBench 99", both trademarks of Ziff Davis Inc. The high-end performance test carried out with WinMark 99 can measure the performance of a disk drive unit when an application program for handling such mass data as image or sound data, for example, those of "Photoshop 4.01" (trademark of Adobe Inc.) is utilized and the business application test can measure the performance of a disk drive unit when such a general application program as "Word Pro 97" (trademark of Lotus Inc.) is used. The buffer size of the disk drive unit utilized for this test is 300 (hexadecimal) pages (768 pages in hexadecimal) and the recording medium size is 2.5 inches. A single hard disk drive (recording capacity: 10 GB, spindle rpm: 4200, and RAM size: 512 kB) is utilized. The system in which the disk drive unit is installed is a general lap-top personal computer (CPU: Pentium-II (trademark), clock frequency: 366 MHz, and RAM size: 128 MB).

As illustrated in FIG. 23, the reference value is increased up to about 450 (decimal) pages (that is, a free space of 450 pages is secured) while a reference value of 0 page (the same as that of the conventional technique) is defined as 1. The performance is improved in accordance with the increase of the reference value. After a certain point, the performance decreases as the reference value is increased. In other words, the reference value reaches the peak at about 450 (decimal) pages. The performance is improved about 25% higher than the condition (reference value=0), which is the same as that of the conventional technique.

However, as depicted in FIG. 24, no significant change appears in the business suite within a reference value of 450 as compared with the same condition (reference value: 0) as that of the conventional technique. When the reference value exceeds 450, however, the performance sharply decreases.

As a result, if the reference value is set to 450, the performance can be improved by about 25% in the high-end performance tests. The performance is not degraded even in the business application tests with the reference value set to 450.

A preferred embodiment of the present invention utilizes a buffer memory implemented as a cache and stored in RAM to reduce a time latency between the issue of a write request and when the actual associated data is actually written to a recording medium. To further reduce the time latency, the present invention does not allow the buffer memory to become fall by preventing subsequent write requests to be issued when there does not exist adequate space in the buffer memory to store a further write request. Also, an execution order of issued requests may be rearranged to allow write requests with lesser time latencies to be executed earlier. As described above, according to a preferred embodiment of the present invention, preventing a cache memory (sector buffer) from being completely occupied results in reduced latency for the execution of data write commands. This scheme improves the performance of a hard disk drive unit.

While the invention has been particularly shown and described with reference to a preferred embodiment, it will be understood by those skilled in the art that various changes in form and detail may be made therein without departing from the spirit and scope of the invention.

What is claimed is:

1. A method of writing data on a recording medium, in response to a write request issued from an external device, comprising the steps of:
   receiving a write command;
   storing write data corresponding to said write command in a buffer memory;
   checking a first condition that determines whether or not a free space of said buffer memory is larger than a predetermined reference value, which is greater than a memory space equivalent to a unit of said write data;
   checking a second condition that compares a logical block address of a preceding write command with a logical block address of said write command to ascertain whether or not a position of said logical block address of said write command overlaps a position of said logical block address of said preceding write command; and
   returning a command complete signal to said external device in response to said write command if either said first condition or said second condition is satisfied.

2. The method of writing data on a recording medium according to claim 1, wherein said method further includes the steps of:
   issuing a write command to write data stored in said buffer memory onto said recording medium; and
   returning to said issuing step if said first condition is not satisfied.

3. The method of writing data according to claim 1, wherein said method further includes the step of:
   issuing a write command to write data stored in said buffer memory onto said recording medium.

4. The method of writing data according to claim 3, wherein said step of issuing a write command further comprises the step of:
   writing both write data corresponding to said preceding write command and write data corresponding to said write command in adjacent sectors of said recording medium if said second condition is satisfied.

5. A disk drive unit, comprising:
   a recording medium with capability for random access;
   a command memory for storing a write command received from an external device until said write command is executed;
   a buffer memory for storing write data corresponding to said write command;
   a write specification control for controlling the writing of said data on said recording medium;
   a first logic circuit for checking a first condition, wherein said first condition determines whether or riot a free space of said buffer memory is larger than a predetermined reference value that is greater than a memory space equivalent to a unit of said write data, wherein a command complete signal is returned to said external device in response to said write command if said first logic circuit determines said first condition is satisfied; and
   a second logic circuit utilized for checking a second condition, wherein said second condition determines a relationship between a position of a logical block address of said write command stored in said command memory and a position of a logical block address of a new write command.

6. The disk drive unit according to claim 5, further comprising:
   a delay circuit for suspending said command complete signal until said first logic circuit determines that said free space of said buffer memory is less than said predetermined reference value.

7. The disk drive unit according to claim 5, wherein said relationship between said logical block address of said write command stored in a command memory and a position of a logical block address of a new write command may be (1) overlapping (2) separated by at most a predetermined distance or (3) separated by more than said predetermined distance.

8. The disk drive unit according to claim 5, where in said command complete signal is returned to said external device in response to said new write command if said first logic circuit determines that said first condition is satisfied or said second logic circuit determines that said second condition is satisfied.

9. The disk drive unit according to claim 5, wherein said command complete signal is suspended until said first condition and said second condition are satisfied.

10. The disk drive unit according to claim 9, wherein said write specification control specifies writing of data corresponding to a plurality of write commands on said recording medium if said second condition is satisfied.

* * * * *

UNITED STATES PATENT AND TRADEMARK OFFICE
CERTIFICATE OF CORRECTION

PATENT NO. : 6,842,801 B2  Page 1 of 1
APPLICATION NO. : 09/838994
DATED : January 11, 2005
INVENTOR(S) : Shuji Yamada It is certified that error appears in the above-identified patent and that said Letters Patent is hereby corrected as shown below:

Column 14,
Line 58, delete "fall" and insert -- full --.

Column 16,
Line 37, delete "riot" and insert -- not --.

Signed and Sealed this

Twenty-seventh Day of June, 2006

JON W. DUDAS
*Director of the United States Patent and Trademark Office*